US009281950B2

(12) United States Patent
Sharma (10) Patent No.: US 9,281,950 B2
(45) Date of Patent: Mar. 8, 2016

(54) METHOD FOR USING INTELLIGENT ROUTER IN CHARGING SYSTEM AND APPARATUS ASSOCIATED THEREWITH (75) Inventor: Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 766 days.

(21) Appl. No.: 13/268,205

(22) Filed: Oct. 7, 2011

(65) Prior Publication Data

US 2013/0091041 A1    Apr. 11, 2013

(51) Int. Cl.
G06Q 30/04 (2012.01)
H04L 12/14 (2006.01)
H04L 12/24 (2006.01)
H04L 29/08 (2006.01)

(52) U.S. Cl.
CPC ........ *H04L 12/1407* (2013.01); *H04L 41/0668* (2013.01); *H04L 67/1002* (2013.01); *H04L 67/1034* (2013.01)

(58) Field of Classification Search
CPC .... G06Q 30/04; G06Q 20/40; H04N 5/44543
USPC ................... 705/26, 30, 7.23, 7.25, 26.41, 40
See application file for complete search history.

(56) References Cited

U.S. PATENT DOCUMENTS

| 7,117,169 | B2* | 10/2006 | Zara | G06Q 10/06 700/106 |
| 8,423,468 | B2* | 4/2013 | Karlsson | G06Q 20/40 705/44 |
| 2003/0088679 | A1 | 5/2003 | Hori | |
| 2007/0111706 | A1* | 5/2007 | Kumar et al. | 455/406 |
| 2008/0299944 | A1 | 12/2008 | Cai | |
| 2009/0142035 | A1* | 6/2009 | Kummer | H04N 5/44543 386/296 |
| 2010/0304710 | A1 | 12/2010 | Sharma et al. | |

(Continued)

FOREIGN PATENT DOCUMENTS

JP    2003143250 A    5/2003
JP    2011521334 A    7/2011

(Continued)

OTHER PUBLICATIONS

RFC 3588, Diameter Base Protocol, Network Working Group, Standards Track, Calhoun et al., Sep. 2003, 147 pages.

(Continued)

*Primary Examiner* — Robert R Niquette
*Assistant Examiner* — Rokib Masud
(74) *Attorney, Agent, or Firm* — Fay Sharpe LLP (57) ABSTRACT A method for using a charging system to account for service provided by a network element (NE) of a service provider network includes receiving an accounting request (ACR) from the NE at a router in the charging system, the ACR associated with service provided by the NE in the service provider network in conjunction with a communication session; modifying the ACR to form a modified ACR; sending the modified ACR to a charging collection function (CCF) server; receiving an accounting answer from the CCF server indicating the CCF server was not able to process the modified ACR; and resending the modified ACR to the CCF server or changing the modified ACR to form a revised ACR and sending the revised ACR to an alternate CCF server. A router associated with the method includes a service network communication module, a message processing module, and a charging system communication module.

21 Claims, 7 Drawing Sheets (56) References Cited

U.S. PATENT DOCUMENTS

| | | | |
|---|---|---|---|
| 2011/0061061 A1 | 3/2011 | Chen et al. | |
| 2011/0119179 A1* | 5/2011 | Votaw et al. | 705/40 |
| 2011/0153460 A1* | 6/2011 | Watts | 705/27.1 |
| 2012/0123914 A1 | 5/2012 | Sharma | |
| 2012/0150706 A1* | 6/2012 | Hashir | G06Q 30/04 705/34 |

FOREIGN PATENT DOCUMENTS

| | | |
|---|---|---|
| KR | 10-1999-0054736 A | 7/1999 |
| KR | 10-0253800 B1 | 4/2000 |
| KR | 10-2004-0043735 A | 5/2004 |
| WO | 2011/018020 A1 | 2/2011 |

OTHER PUBLICATIONS

U.S. Appl. No. 12/946,394 to Sharma, filed Nov. 15, 2010, Method of Choosing an Alternate Offline Charging System During an Overload and Apparatus Associated Therewith.

PCT Patent Application No. PCT/US2012/055291, International Search Report, Mailed March 20, 2013, 3 Pages.
PCT Patent Application No. PCT/US2012/055291, Written Opinion of the International Searching Authority, Mailed March 20, 2013, 5 Pages.
English Bibliography for PCT Patent Application Publication No. WO 2011/018020 A1, Published Feb. 17, 2011, Printed From Thomson Innovation on May 9, 2013, 3 Pages.
English Bibliography for Japanese Patent Application Publication No. JP2003143250A, published May 16, 2003, printed from Thomson Innovation on Jun. 19, 2015, 4 pp.
English Bibliography for Japanese Patent Application Publication No. JP2011521334A, published Jul. 21, 2011, printed from Thomson Innovation on Jun. 19, 2015, 4 pp.
English Bibliography for Korean Patent Application Publication No. KR253800B1, published Apr. 15, 2000, printed from Thomson Innovation on Jun. 19, 2015, 3 pp.
English Bibliography for Korean Patent Application Publication No. KR2004043735, published May 27, 2004, printed from Thomson Innovation on Jun. 19, 2015, 3 pp.

* cited by examiner

METHOD FOR USING INTELLIGENT ROUTER IN CHARGING SYSTEM AND APPARATUS ASSOCIATED THEREWITH

BACKGROUND

This disclosure relates to use of a router in a charging system to account for service provided by a network element (NE) of a service provider network. Exemplary embodiments of the router and methods for its use are described. The router acts as a proxy for receiving accounting requests (ACRs) from NEs in the service provider network and routing the ACRs to charging control functions (CCFs) in the charging system and vice versa for accounting answers (ACAs). The router provides intelligence for further processing of ACRs when the ACA indicates certain types of error or failure conditions, such as overload and transient failure conditions. For these conditions, the router can determine whether or not to re-try sending the ACR to the same CCF or to select an alternate CCF. If the subsequent attempt by the router to submit the ACR for processing is successful, the problem is resolved without involving the NE. Various embodiments are described for error and failure conditions in which the ACA indicates the CCF is too busy to process the ACR (i.e., Result Code 3004) or that the CCF is at least temporarily out of space to process the ACR (i.e., Result Code 4002). However, the methods and apparatus described herein may also be used to process other types of error and failure conditions.

In telecommunication and data networks, offline charging is provided by a multitude of servers implementing a CCF. The CCF is an integral part of business operations for a service provider. The CCF may include a plurality of CCF servers (i.e., nodes) to accumulate charges for communications sessions associated with a service provider network. For example, the service provider network may include various legacy communication networks, internet protocol (IP) multimedia subsystem (IMS) networks, long term evolution (LTE) networks, and other suitable communication service networks in any suitable combination. The CCF receives ACRs from signaling and bearer NEs in these communication service networks. The NEs implement a charging trigger function (CTF). CTFs integrated within the NEs provide ACRs to the CCF. The accounting can be discrete as in an event, such as sending or receiving a short message or related to a session which begins with a start notification, zero or more interim accounting message, and finishes with a stop notification. The CCF acknowledges ACR messages via ACA messages. ACR and ACA messages, for example, may be based on the Diameter Base Protocol (see Request for Comments (RFC) 3588), The contents of RFC 3588 Diameter Base Protocol are fully incorporated herein by reference. The Diameter Base Protocol runs on transmission control protocol (TCP)/IP or stream control transmission protocol (SCTP).

Figure 1:
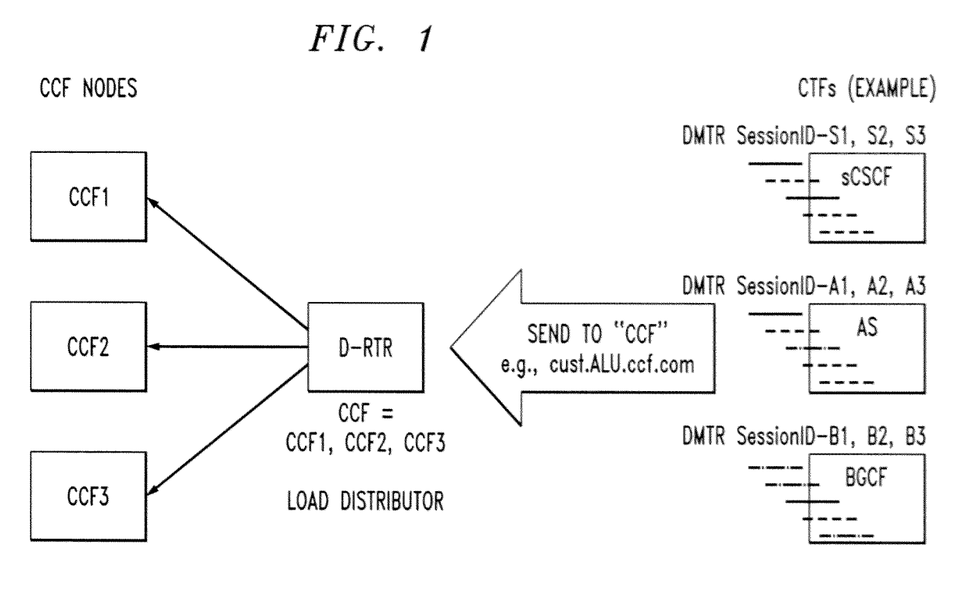
FIG. 1 is a functional diagram showing an exemplary embodiment of a charging system with a D-RTR that serves as a load distributor for routing ACRs to multiple CCFs.

In large networks, it is common to see hundreds of CTFs and tens of CCF servers in the CCF. For reasons of security, it is typical to have the identity of the CTFs provisioned at the CCF servers. This ensures that when accounting messages arrive from a CTF, the corresponding CCF server can determine that the messages are coming from a known or trusted host. However, this security aspect gives rise to a provisioning problem, where each of the hundreds of CTFs must be individually defined in each of the tens of CCF servers. To alleviate this problem, a Diameter Router (D-RTR) may be employed. For example, FIG. 1 shows a charging system with a D-RTR. The D-RTR acts as an intelligent proxy or intelligent router. For example, each session reported from each of the hundreds of CTFs may terminate at the D-RTR. Correspondingly, D-RTR initiates messaging toward the CCF servers. Responses from the CCF servers terminate at the D-RTR. The D-RTR conveys the responses back to the original CTF that initiated the corresponding ACR.

Network Elements<D-RTR>CCF-1, CCF-2 . . . CCF-N Implement CTF<Function>

Here, the task of the D-RTR is to ensure that ACRs are more or less evenly distributed among the CCF servers. Unlike a client-based CCF load distribution function (LDF) within the CTFs, which can be viewed as a simple round-robin methodology for each communication session in which the CTF is participating, the D-RTR must operate within two principle constraints while serving a plurality of CTFs and a plurality of CCF servers: 1) the ACRs within a Diameter session from one NE/CTF must be forwarded to the same CCF server and 2) the ACA message sent in response by the CCF server must be conveyed to the NE/CTF originator of the corresponding ACR.

The advantage of the D-RTR is that it hides the network topology on one hand so that the CTFs can use the D-RTR as the destination of their ACR messages, without having to worry about selection of a CCF server or an alternate peer, for instance, in case of CCF outage or failure conditions. The D-RTR provides the additional benefit that it can monitor the count of ongoing sessions, or even the individual CCF server's load carrying capacity, in order to determine the destination for a new accounting session. This keeps the CCF servers more or less loaded at or under their engineered limits.

However, it is the topology hiding part that creates an additional problem. In existing configurations, when a specific CCF server develops overload or reports a transient error condition and indicates to the NE/CTF to try an alternate peer, as per RFC 3588, the corresponding NE/CTF would not know how to react to this because it would not be able to choose an alternate peer because the topology of the CCF servers are hidden from the view of the corresponding NE/CTF. In existing D-RTR configurations, in case the NE/CTF retransmits the ACR, the D-RTR, working under the first principle constraint mentioned above (i.e., forwarding ACRs from a given CTF to the same CCF server for a given session) would tend to send the ACR to the same CCF server that just indicated that the CTF should choose an alternate peer. This creates an infinite or endless loop situation, at least until the overloaded CCF server can recover from the overload condition or until the transient error subsides. The situation is further exacerbated and the recovery of the overloaded CCF server is further delayed since the D-RTR keeps resending the ACR messages to the same CCF server because it is generally not aware of the load situation at the CCF server.

Based on the foregoing, techniques that enable a router in a charging system to provide intelligent message processing of ACRs when a CCF server currently selected for processing the ACR is experiencing certain types of error or failure conditions. Additionally, it is desirable that the router be able to resolve such conditions without involving the NE that originated the ACR.

SUMMARY

In one aspect, a method for using a charging system to account for service provided by an NE of a service provider network is provided. In one embodiment, the method includes receiving an ACR from an NE of a service provider network at a router in a charging system, the ACR associated with service provided by the NE in the service provider network in conjunction with a communication session, the charging system including a plurality of CCF servers associated with the router for processing ACRs from one or more NEs of the service provider network in conjunction with one or more communication sessions; modifying the received ACR at the router to form a modified ACR; sending the modified ACR from the router to a first CCF server selected from the plurality of charging control function servers; receiving an ACA from the first CCF server at the router indicating the first CCF server was not able to process the modified ACR; and resending the modified ACR from the router to the first CCF server or changing the modified ACR at the router to form a revised ACR and sending the revised ACR from the router to an alternate CCF server selected from the plurality of charging control function servers.

In another aspect, an apparatus for use in a charging system to account for service provided by an NE of a service provider network is provided. In one embodiment, the apparatus includes a service network communication module for receiving an ACR from an NE of a service provider network, the ACR associated with service provided by the NE in the service provider network in conjunction with a communication session, the charging system including a plurality of CCF servers for processing ACRs from one or more NEs of the service provider network in conjunction with one or more communication sessions; a message processing module in operative communication with the service network communication module for modifying the received ACR to form a modified ACR; and a charging system communication module in operative communication with the message processing module for sending the modified ACR to a first CCF server selected from the plurality of charging control function servers. In this embodiment, the charging system communication module is also for receiving an ACA from the first CCF server indicating the first CCF server was not able to process the modified ACR. In the embodiment being described, the message processing module is also for determining whether to resend the modified ACR to the first CCF server via the charging system communication module or to change the modified ACR to form a revised ACR and send the revised ACR to an alternate CCF server via the charging system communication module, the alternate CCF server being selected from the plurality of charging control function servers.

In another aspect, a non-transitory computer-readable medium storing program instructions is provided. When executed by a computer, the program instructions cause a corresponding computer-controlled router in a charging system to perform a method for using the charging system to account for service provided by an NE of a service provider network. In one embodiment, the method includes: receiving an ACR from an NE of a service provider network at a router in a charging system, the ACR associated with service provided by the NE in the service provider network in conjunction with a communication session, the charging system including a plurality of CCF servers associated with the router for processing ACRs from one or more NEs of the service provider network in conjunction with one or more communication sessions; modifying the received ACR at the router to form a modified ACR; sending the modified ACR from the router to a first CCF server selected from the plurality of charging control function servers; receiving an ACA from the first CCF server at the router indicating the first CCF server was not able to process the modified ACR; and resending the modified ACR from the router to the first CCF server or changing the modified ACR at the router to form a revised ACR and sending the revised ACR from the router to an alternate CCF server selected from the plurality of charging control function servers.

In another aspect, a method for using a charging system to account for service provided by a network element of a service provider network is provided. In one embodiment, the method includes: receiving an accounting request from a network element of a service provider network at a router in a charging system, the accounting request associated with service provided by the network element in the service provider network in conjunction with a communication session, the charging system including a plurality of charging collection function servers associated with the router for processing accounting requests from one or more network elements of the service provider network in conjunction with one or more communication sessions; modifying the received accounting request at the router to form a modified accounting request; sending the modified accounting request from the router to a first charging collection function server selected from the plurality of charging control function servers; receiving an accounting answer from the first charging collection function server at the router; determining the accounting answer indicates the first charging collection function server successfully processed the modified accounting request; modifying the received accounting answer at the router to form a modified accounting answer; and sending the modified accounting request from the router to the NE.

Further scope of the applicability of this the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Various embodiments of a router and methods for using the router in a charging system to account for service provided by an NE in a service provider network are disclosed herein. The exemplary embodiments describe how the router acts as a proxy for receiving ACRs from NEs in the service provider network and routing the ACRs to CCFs in the charging system and relaying the ACA back to the originating NE. The exemplary embodiments describe how the router provides intelligence for further processing of ACRs when the ACA from the CCF indicates certain exemplary types of error or failure conditions, such as overload and transient failure conditions. For these exemplary conditions, the router can determine whether or not to re-try sending the ACR to the same CCF or to select an alternate CCF. If the subsequent attempt by the router to submit the ACR for processing is successful, the problem is resolved without involving the NE.

As described above, the typical behavior of an existing D-RTR would be to "hope" for a receding load at an overloaded CCF server while not being aware of the overload situation explicitly and not being able to select an alternate peer CCF. This is not an efficient or practical solution. However, not using a D-RTR has other drawbacks that are also mentioned above. For example, excessive provisioning is required when a D-RTR is not used and a central element management system (EMS) is required to ensure correct provisioning is maintained across the CCF servers. Any subsequent changes to the CCF architecture and CTF/CCF configurations create additional operational expense (OPEX) for maintenance of the provisioning.

In the various embodiments described herein, CTFs connect to the D-RTR and send ACRs to the D-RTR. The D-RTR may examine internal tables or apply intelligence (e.g., using a hash function on session identifier) to select which CCF server should handle the accounting session. The D-RTR may also consider the availability and current load index on each of the CCF servers before choosing the best-fit.

The various embodiments described herein allow the D-RTR to examine the responses from the CCF servers in an optimized way, so as not to delay the round trip time (RTT) unnecessarily, and take corrective local action, which consists of initiating an intelligent internal rebound, as necessary, while still keeping the CCF topology hidden from the clients (i.e., NEs/CTFs) requesting the accounting service.

A part of the solution for load determination at each CCF server and subsequent selection of a CCF server for a new accounting session and/or subsequent selection a CCF alternate peer server may be based on a previous method for choosing an alternate offline charging system during an overload disclosed in U.S. patent application Ser. No. 12/946,394 to Sharma, assigned to Alcatel-Lucent USA, Inc., filed Nov. 15, 2010, the contents of which are fully incorporated herein by reference. The '394 application is relevant from the perspective of choosing an appropriate CCF alternative peer server from among those available based on a CCF load index.

In the embodiments disclosed herein, when a CTF sends an ACR that is rejected by an overloaded CCF server or by a CCF server experiencing a transient error, the D-RTR uses an alternate peer selection methodology and intelligence to internally bounce the message to a CCF server suitable for handling the message.

In order to describe the implementation, a functional walk-through is provided below. This description is applicable to FIGS. 2 and 3 which describe the external behavior of the functionality in a step-wise manner.

Figure 2:
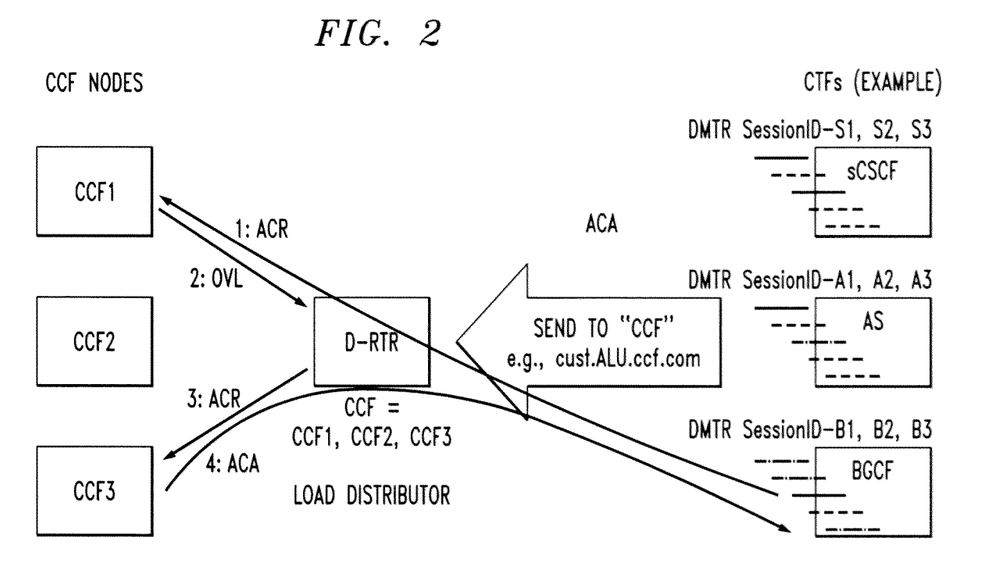
FIG. 2 is a functional diagram showing another exemplary embodiment of a charging system with a D-RTR that provides secondary routing of ACRs when a primary CCF reports an overload condition.

With reference to FIG. 2, an exemplary embodiment of a charging system includes a D-RTR that provides secondary routing of ACRs when a primary CCF reports an overload condition. In a first step (i.e., 1:ACR), a CTF initiates reporting of accounting for a session by sending an ACR. This ACR, per RFC 3588, is compatible with the structure given below:

```
<ACR> ::= < Diameter Header: 271, REQ, PXY >
    < Session-Id >
    { Origin-Host }
    { Origin-Realm }
    { Destination-Realm }
    { Accounting-Record-Type }
    { Accounting-Record-Number }
    [ Acct-Application-Id ]
    [ Vendor-Specific-Application-Id ]
    [ User-Name ]
    [ Accounting-Sub-Session-Id ]
    [ Acct-Session-Id ]
    [ Acct-Multi-Session-Id ]
    [ Acct-Interim-Interval ]
    [ Accounting-Realtime-Required ]
    [ Origin-State-Id ]
    [ Event-Timestamp ]
  * [ Proxy-Info ]
  * [ Route-Record ]
  * [ AVP ]
```

The Destination-Realm attribute-variable pair (AVP) of this request carries the routing address for the D-RTR. The CTF does not know the CCF topology behind the D-RTR.

After receiving the ACR, the D-RTR examines the request and checks the Accounting-Record-Type AVP. The Accounting-Record-Type AVP is an enumerated value from 1 through 4 with the following meanings: 1—Event-Record, 2—Start-Record, 3—Interim-Record, and 4—Stop-Record.

A value of 1 indicates the ACR is a non-session related accounting message. Under these circumstances, it can be assumed that there is no requirement for the D-RTR to send it to a specific CCF server. In other words, the D-RTR can select any suitable CCF server for each Event-Record.

A value of 2 indicates the reporting of a new session. This means that a CCF server that is suitable needs to be selected for handling this new session. The D-RTR may choose the CCF server. One way to choose an appropriate CCF server for handling a new request is described in U.S. patent application Ser. No. 12/946,394 to Sharma, assigned to Alcatel-Lucent USA, Inc., filed Nov. 15, 2010, the contents of which are fully incorporated herein by reference. The '394 application also provides logic for determination of an alternate peer CCF server in case a CCF server develops an overload. The logic for the embodiments disclosed herein may be based on the '394 application, except that initial selection of the CCF server for handling the session may simply be based on the load index and load carrying capacity of each of the available CCF servers. There may not be any overload redirection involved at the initial selection stage. Alternatively, a round-robin or a weighted round-robin scheme may be used to determine the CCF server that should service the ACRs for the new session. For example, an algorithm may be applied to the Session-ID AVP to determine a primary CCF server to handle the session while keeping a secondary CCF server in mind in case the primary CCF server happens to be out-of-service (OOS).

A value of 3 or 4 in the Accounting-Record-Type AVP is indicative of an ongoing session which is already being served by a CCF server. In this case, the D-RTR determines which CCF server is handling the session. This is done in one of the following ways: 1) by applying the same function on the Session-ID AVP to determine the Diameter CCF server handling the session in the same manner as for a start-record while keeping a secondary CCF server in mind in case the first CCF server happens to be OOS or 2) by a session-host lookup table implementation at the D-RTR. The lookup table may include all unique session-identifiers (ID) in progress at the moment in the network. Associated with each session-ID is a primary and a secondary CCF server instance. The lookup table may also include other indications about CCF load conditions and availability. The lookup table can identify the initial CCF server assigned for the corresponding CTF for this communication session and updated each time an alternate peer CCF server is assigned to the communication session for the corresponding CTF.

At the end of the first step (i.e., 1:ACR), the D-RTR should have a CCF server identified. Referring to FIG. 2, this is CCF-1 in this example scenario. The D-RTR forwards the ACR to CCF-1 after making the following modifications in the request:

```
<ACR> ::= < Diameter Header: 271, REQ, PXY >
          < Session-Id >
          { Origin-Host }
          { Origin-Realm }
          { Destination-Realm }
          { Accounting-Record-Type }
          { Accounting-Record-Number }
          [ Acct-Application-Id ]
          [ Vendor-Specific-Application-Id ]
          [ User-Name ]
          [ Accounting-Sub-Session-Id ]
          [ Acct-Session-Id ]
          [ Acct-Multi-Session-Id ]
          [ Acct-Interim-Interval ]
          [ Accounting-Realtime-Required ]
          [ Origin-State-Id ]
          [ Event-Timestamp ]
        * [ Proxy-info ]
        * [ Route-Record ]
        * [ AVP ]
```

The Origin-Host and Origin-Realm AVP information in this forwarded ACR identifies the D-RTR, while the Destination-Realm AVP information contains the realm of CCF-1. In addition, the D-RTR appends a Route-Record AVP to this forwarded request. The Route-Record AVP contains the identity of the CTF that the request was received from, in essence, identifying the "true" or "actual" originator of the ACR.

In a second step (i.e., 2:OVL), assuming CCF-1 is experiencing overload and is unable to reliably process the sent ACR, CCF-1 must declare an error condition in an ACA. This ACA response is sent back to the D-RTR because the D-RTR previously inserted its identity in the Origin-Host AVP of the routed ACR. The ACA response from the CCF-1 to D-RTR would be of the following form:

```
<ACA> ::= < Diameter Header: 271, PXY >
          < Session-Id >
          { Result-Code }
          { Origin-Host }
```

-continued

```
          { Origin-Realm }
          { Accounting-Record-Type }
          { Accounting-Record-Number }
          [ Acct-Application-Id ]
          [ Vendor-Specific-Application-Id ]
          [ User-Name ]
          [ Accounting-Sub-Session-Id ]
          [ Acct-Session-Id ]
          [ Acct-Multi-Session-Id ]
          [ Error-Reporting-Host ]
          [ Acct-Interim-Interval ]
          [ Accounting-Realtime-Required ]
          [ Origin-State-Id ]
          [ Event-Timestamp ]
        * [ Proxy-Info ]
        * [ AVP ]
```

One of the AVPs in the ACA response examined by the D-RTR is the Result-Code AVP. The Result-Code AVP (code 268), for example, may define the values 1001, 2001-2002, 3001-3010, 4001-4002 and 5001-5017. The 1xxx values in the Result-Code AVP are informational. The 2xxx values are indicative of success. Therefore, the D-RTR allows ACA responses with 1xxx or 2xxx values in the Result-Code AVP to pass back to the originating CTF. The D-RTR uses the Route-Record AVP information to populate the Origin-Host AVP in the ACA response and routes the ACA response to the CTF entity that initiated the corresponding ACR.

The D-RTR may handle at least some of the remaining values for the Result-Code AVP using various techniques described herein to overcome certain error or failure conditions at the CCF server currently assigned to handle the session. The 3xxx values in the Result-Code AVP identify certain types of protocol errors. The 4xxx values identify certain types of transient failures. The 5xxx values in the Result-Code AVP identify certain types of permanent failures.

For example, a commonly used technique to indicate an overload condition at the CCF server is to send an ACA with a 3004 value in the Result-Code AVP. The 3004 value represents a Diameter_Too_Busy error. The Diameter_Too_Busy error is of particular interest to the D-RTR. After receiving an ACA from CCF-1 that reports a Diameter_Too_Busy error in the Result-Code AVP, the D-RTR determines, in conjunction with the load indices and other policy rules in place, an alternate peer CCF server from among the available CCF servers. Referring to FIG. 2, this alternate peer CCF server happens to be CCF-3 for this exemplary scenario. Therefore, the D-RTR changes the Destination-Realm in the previously forwarded ACR message to reflect the alternate peer CCF server and sends the revised ACR message, with the previously modified with the new Origin-Host and Route-Record AVP information, to CCF-3. This is shown as a third step (i.e., 3:ACR) in the FIG. 2. A fourth step (i.e., 4:ACA) shows the ACA message coming back to the D-RTR, which is modified by the D-RTR to reflect the correct Origin-Host AVP information and routed to the originating CTF for the original ACR.

Figure 3:
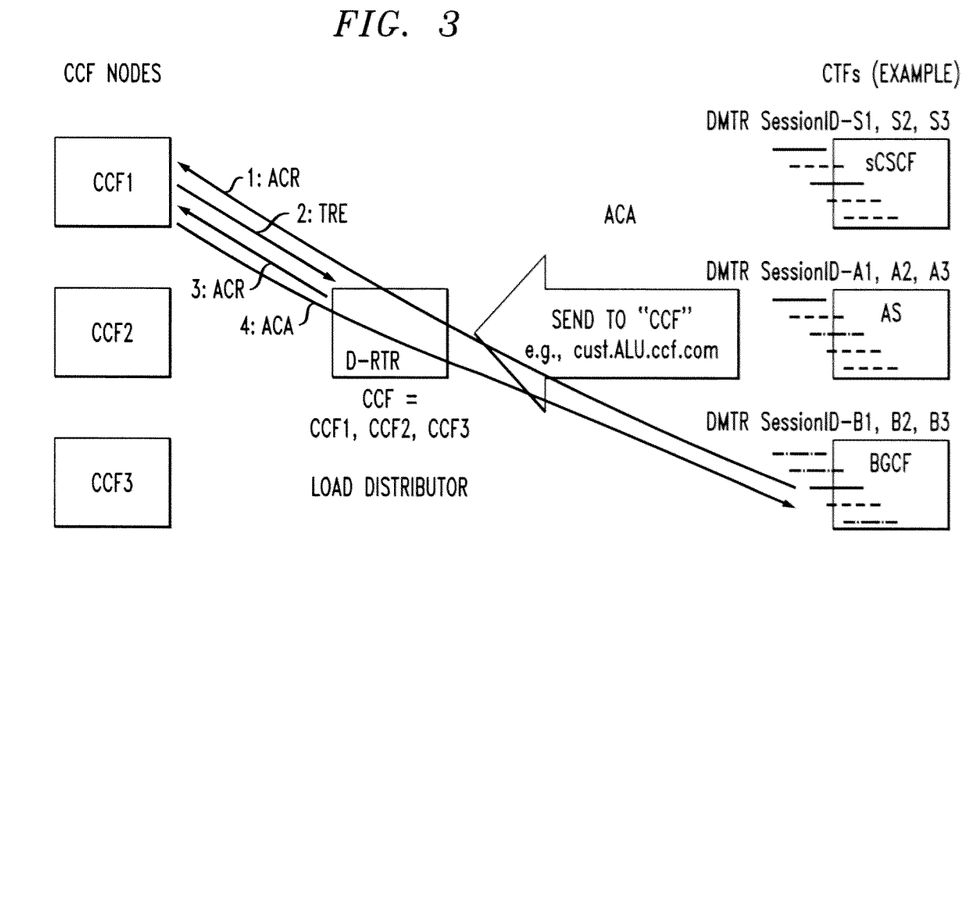
FIG. 3 is a functional diagram showing another exemplary embodiment of a charging system with a D-RTR that provides secondary routing of ACRs when a primary CCF reports a transient failure condition.

With reference to FIG. 3, another exemplary embodiment of a charging system includes a D-RTR that provides secondary routing of ACRs when a primary CCF reports a transient failure condition. As for the 4xxx result-code values, a commonly used technique to indicate a temporary shortage of available space for storage of an ACR at a CCF server is to send an ACA with a 4002 value in the Result-Code AVP. The 4002 value represents a Diameter_Out_Of_Space error. For an exemplary scenario, assume that CCF-1 reports a Diameter_Out_Of_Space error in the ACA in response to receiving the ACR from the D-RTR. This happens when the CCF in question was unable to commit the received ACR to stable storage due to a temporary shortage of storage space condition. So, for the ACR sent in the first step (i.e., 1:ACR), referring to FIG. 3, the CCF-1 responds in a second step (i.e., 2:TRE) with an ACA containing a 4002 value in the Result-Code AVP to indicate a transient error due to a temporary shortage of available storage space. For this exemplary scenario, the D-RTR waits for a configurable amount of time, typically a few seconds, and retries sending the modified ACR to the same CCF-1, as shown in a third step (i.e., 3: ACR). If the ACR is accepted by CCF-1 without further errors, the D-RTR receives a positive ACA with a 2xxx value in the Result-Code AVP. This is shown in a fourth step (i.e., 4:ACA) of FIG. 3. The D-RTR routes the positive ACA back to the Diameter client (i.e., originating CTF) that issued the original ACR. However, if the Diameter_Out_Of_Space error persists, for example, when there is a severe shortage caused by secondary memory failure at the CCF server, it is likely that CCF-1 would repeat the error condition. In this case, the D-RTR behavior could repeat the retry attempt for a predetermined number of times and then proceed to selecting an alternate peer CCF server to handle this ACR as depicted in FIG. 2. Alternatively, the D-RTR could proceed directly to selecting an alternate peer CCF server (see FIG. 2) after failure of the first retry attempt.

As for the 5xxx result-code values, the D-RTR routes ACAs with 5xxx values in the Result-Code AVP back to the originating CTF peer because these codes represent permanent failures in the corresponding CCF server.

In summary, the various embodiments described herein provide an intelligent disposition of an ACA received by a D-RTR from a currently-assigned CCF server to which the D-RTR had routed an ACR received by the D-RTR from an originating CTF. The various techniques described herein avoid an 'infinite loop' situation between the originating CTF, D-RTR, and currently-assigned CCF server. The various embodiments described herein provide a CCF network architecture that incorporates the D-RTR to hide the overall network topology between the origination CTFs and the destination CCF servers. The various techniques described herein also provide a reduction in provisioning at the origination CTFs and the destination CCF servers by using the D-RTR. Existing solutions tend to delay the processing of ACRs and increase the network traffic by having the CTFs repeat sending the original ACR message to the same CCF server.

Figure 4:
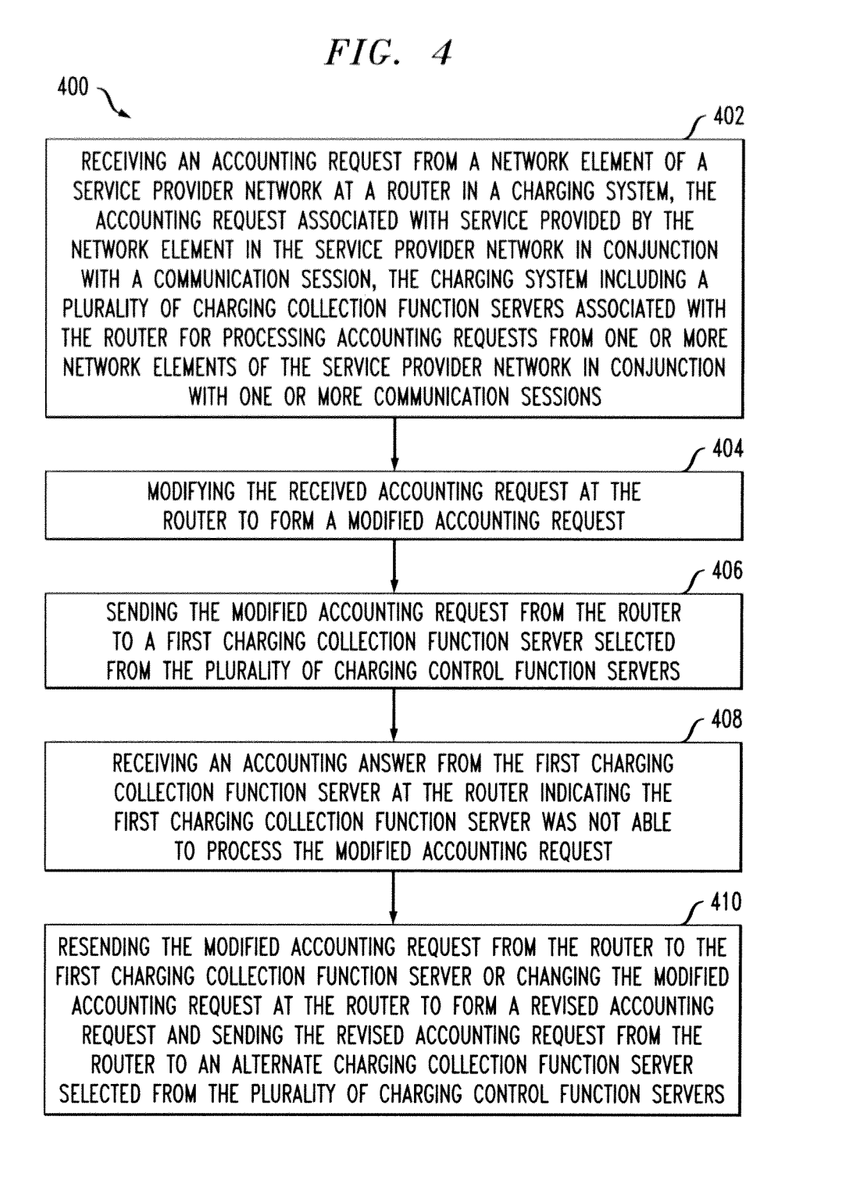
FIG. 4 is a flow chart of an exemplary embodiment of a process for using a charging system to account for service provided by an NE of a service provider network.

Referring again to the drawings wherein the showings are for purposes of illustrating the exemplary embodiments only and not for purposes of limiting the claimed subject matter, FIG. 4 depicts an exemplary embodiment of a process 400 for using a charging system to account for service provided by an NE of a service provider network begins at 402 where an ACR from an NE of a service provider network is received at a router in a charging system. The ACR being associated with service provided by the NE in the service provider network in conjunction with a communication session. The charging system may include a plurality of CCF servers associated with the router for processing ACRs from one or more NEs of the service provider network in conjunction with one or more communication sessions.

Next, the received ACR is modified at the router to form a modified ACR (404). At 406, the modified ACR is sent from the router to a first CCF server selected from the plurality of charging control function servers. Next, an ACA from the first CCF server is received at the router indicating the first CCF server was not able to process the modified ACR (408). At 410, either the modified ACR is resent from the router to the first CCF server or the modified ACR is changed at the router to form a revised ACR and the revised ACR is sent from the router to an alternate CCF server selected from the plurality of charging control function servers.

Figure 5:
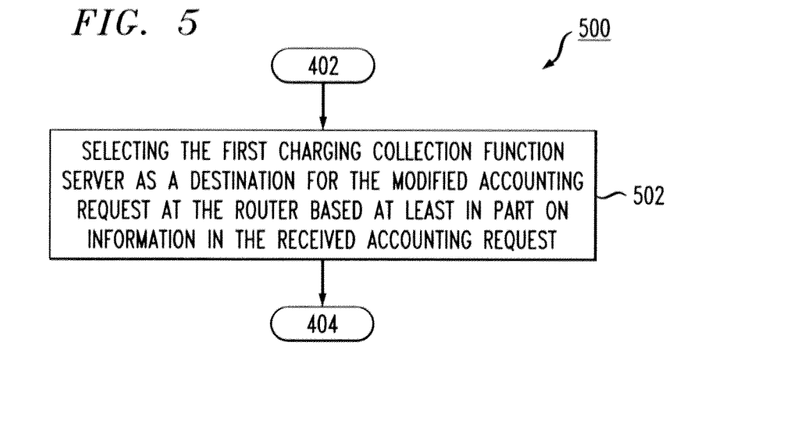
FIG. 5, in combination with FIG. 4, is a flow chart of another exemplary embodiment of a process for using a charging system to account or service provided by an NE of a service provider network.

With reference to FIGS. 4 and 5, another exemplary embodiment of a process 500 for using a charging system to account for service provided by an NE of a service provider network includes the process 400 of FIG. 4 and continues from 402 to 502 where the first CCF server is selected as a destination for the modified ACR at the router based at least in part on information in the received ACR. Next, the process 500 proceeds to 404 of FIG. 4.

In another embodiment, the process 500 includes determining the received ACR is a start record for a new communication session for the NE based at least in part on record type information in the received ACR. In this embodiment, the first CCF server is selected based at least in part on an algorithm that includes a load distribution function relating to distribution of processing loads among the plurality of CCF servers.

In a further embodiment, the process 500 includes selecting the first CCF server based at least in part on one or more of a load index for the first CCF server in relation to load indexes for the plurality of CCF servers, a load carrying capacity for the first CCF server in relation to load carrying capacities for the plurality of CCF servers, a round robin scheme in relation to the plurality of CCF servers, and a weighted round robin scheme in relation to the plurality of CCF servers. In a further embodiment of the embodiment being described, the load index is based at least in part on load information shared with the router by the plurality of CCF servers. In another further embodiment of the embodiment being described, at least one of the round robin scheme and the weighted round robin scheme is based at least in part on applying an algorithm to session identifier information in the received ACR.

In another further embodiment, the process 500 includes storing a session identifier, an originating source identifier, and a selected destination identifier for the new communication session in linked relation in a storage device accessible to the router. In a further embodiment of the embodiment being described, the session identifier is adapted to identify the new communication session, the originating source identifier is adapted to identify the NE as an originating source for the received ACR in conjunction with the new communication session, and the selected destination identifier is adapted to identify the first CCF server as currently selected for processing ACRs for the new communication session that are originated by the NE.

In yet another embodiment, the process 500 includes determining the received ACR is an interim record or a stop record for an ongoing communication session for the NE based at least in part on record type information in the received ACR. In this embodiment, the first CCF server is selected based at least in part on matching the ongoing communication session to a session identifier linked to an originating source identifier representing the NE and a selected destination identifier representing the first CCF. The session identifier, originating source identifier, and selected destination identifier being previously stored in linked relation in a storage device accessible to the router in conjunction with routing a previous ACR received from the NE for the ongoing communication session. In a further embodiment, the session identifier is adapted to identify the ongoing communication session, the originating source identifier is adapted to identify the NE as an originating source for the received ACR in conjunction with the ongoing communication session, and the selected destination identifier is adapted to identify the first CCF server as currently selected for processing ACRs for the ongoing communication session that are originated by the NE.

Figure 6:
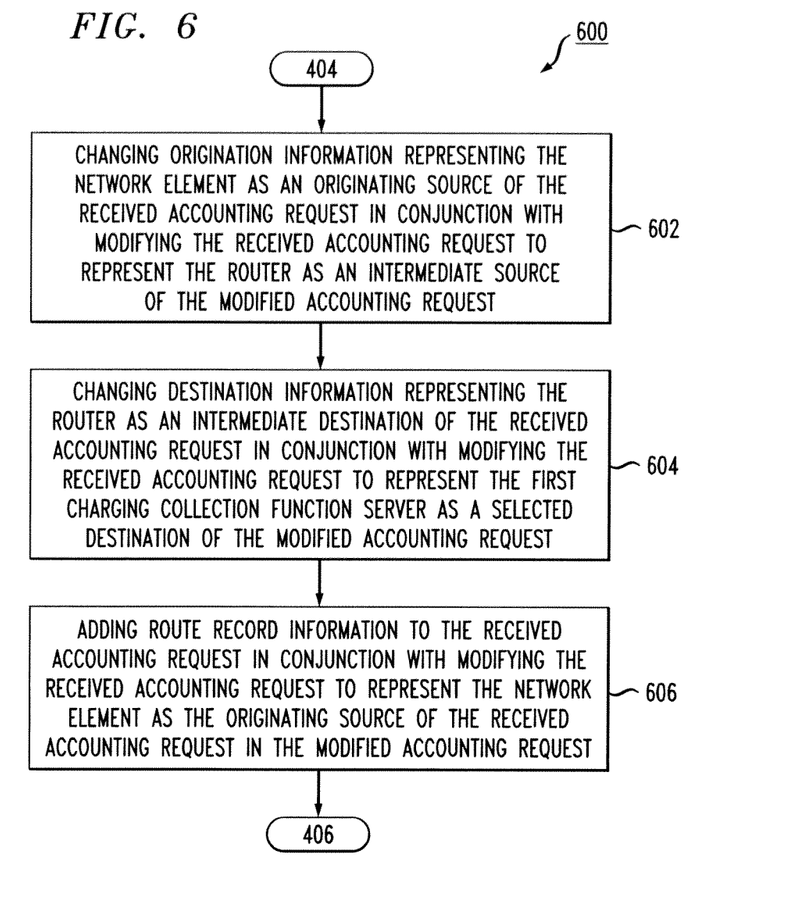
FIG. 6, in combination with FIG. 4, is a flow chart of yet another exemplary embodiment of a process for using a charging system to account for service provided by an NE of a service provider network.

With reference to FIGS. 4 and 6, another exemplary embodiment of a process 600 for using a charging system to account for service provided by an NE of a service provider network includes the process 400 of FIG. 4 and continues from 404 to 602 where origination information representing the NE as an originating source of the received ACR is changed in conjunction with modifying the received ACR to represent the router as an intermediate source of the modified ACR. Next, destination information representing the router as an intermediate destination of the received ACR is changed in conjunction with modifying the received ACR to represent the first CCF server as a selected destination of the modified ACR (604). At 606, route record information is added to the received ACR in conjunction with modifying the received ACR to represent the NE as the originating source of the received ACR in the modified ACR. Next, the process 600 proceeds to 406 of FIG. 4.

In another embodiment of the process 600, the origination information in the received and modified ACRs includes origin host information and origin realm information. In yet another embodiment of the process 600, the destination information in the received and modified ACRs includes destination realm information.

Figure 7:
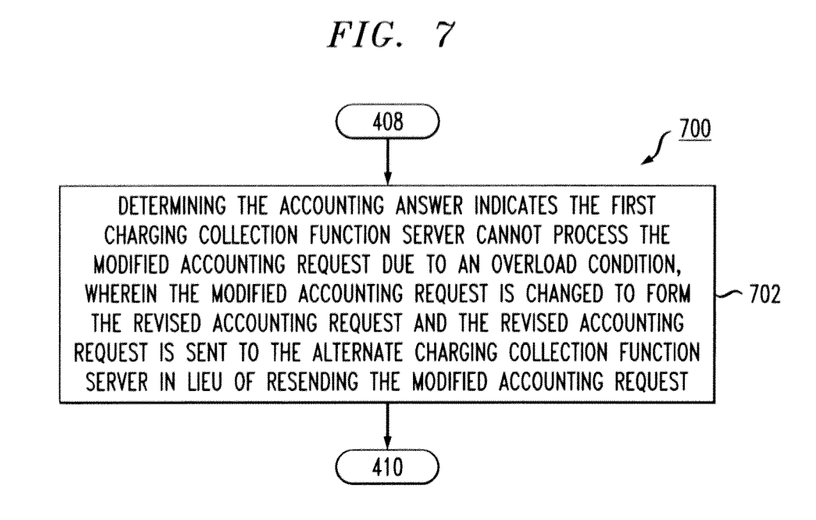
FIG. 7, in combination with FIG. 4, is a flow chart of still another exemplary embodiment of a process for using a charging system to account for service provided by an NE of a service provider network.

With reference to FIGS. 4 and 7, another exemplary embodiment of a process 700 for using a charging system to account for service provided by an NE of a service provider network includes the process 400 of FIG. 4 and continues from 408 to 702 where the process determines the ACA indicates the first CCF server cannot process the modified ACR due to an overload condition. Next, the process 700 proceeds 410 of FIG. 4. For this embodiment, in 410 the modified ACR is changed to form the revised ACR and the revised ACR is sent to the alternate CCF server in lieu of resending the modified ACR.

In another embodiment of the process 700, the ACA indicates the first CCF server is too busy to process the modified ACR. In yet another embodiment of the process 700, the ACA includes result code information with a code value of 3004.

In still another embodiment, the process 700 also includes selecting the alternate CCF server as an alternate destination for the modified ACR at the router based at least in part on an algorithm that includes a load distribution function relating to distribution of processing loads among the plurality of CCF servers.

In a further embodiment, the process 700 also includes selecting the alternate CCF server based at least in part on one or more of a load index for the alternate CCF server in relation to load indexes for the plurality of CCF servers, a load carrying capacity for the alternate CCF server in relation to load carrying capacities for the plurality of CCF servers, a round robin scheme in relation to the plurality of CCF servers, and a weighted round robin scheme in relation to the plurality of CCF servers. In a further embodiment of the embodiment being described, the load index is based at least in part on load information shared with the router by the plurality of CCF servers. In another further embodiment of the embodiment being described, at least one of the round robin scheme and the weighted round robin scheme is based at least in part on applying an algorithm to session identifier information in the modified ACR.

In another further embodiment, the process 700 also includes storing a session identifier, an originating source identifier, and a selected destination identifier for the communication session in linked relation in a storage device accessible to the router. In a further embodiment of the embodiment being described, the session identifier is adapted to identify the communication session, the originating source identifier is adapted to identify the NE as an originating source for the received ACR in conjunction with the communication session, and the selected destination identifier is adapted to identify the alternate CCF server as currently selected for processing ACRs for the communication session that are originated by the NE.

In yet another embodiment, the process 700 also includes receiving an ACA from the alternate CCF server at the router indicating the alternate CCF server successfully processed the revised ACR. In this embodiment, the received ACA is modified at the router to form a modified ACA. In the embodiment being described, the modified ACA is sent from the router to the NE.

Figure 8:
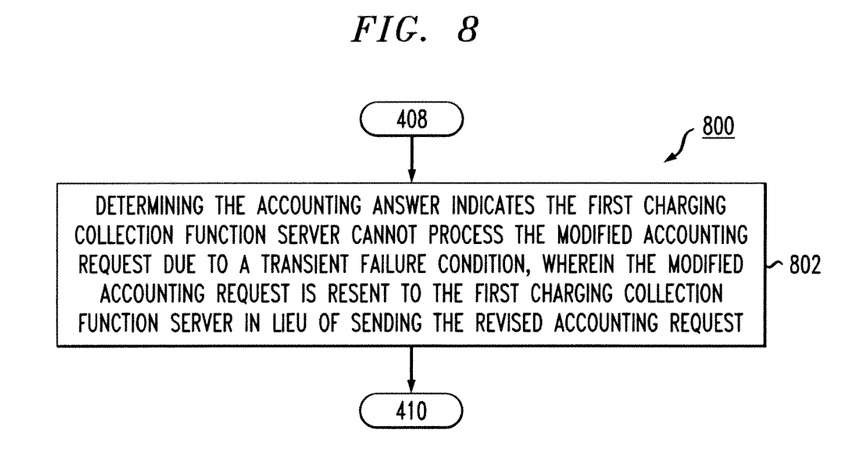
FIG. 8, in combination with FIG. 4, is a flow chart of still yet another exemplary embodiment of a process for using a charging system to account for service provided by an NE of a service provider network.

With reference to FIGS. 4 and 8, another exemplary embodiment of a process 800 for using a charging system to account for service provided by an NE of a service provider network includes the process 400 of FIG. 4 and continues from 408 to 802 where the process determines the ACA indicates the first CCF server cannot process the modified ACR due to a transient failure condition. Next, the process 800 proceeds 410 of FIG. 4. For this embodiment, in 410 the modified ACR is resent to the first CCF server in lieu of sending the revised ACR.

In another embodiment of the process 800, the ACA indicates the first CCF server is at least temporarily out of space to process the modified ACR. In yet another embodiment of the process 800, the ACA includes result code information with a code value of 4002. In still another embodiment, the process 800 also includes waiting a configurable time after receiving the ACA before resending the modified ACR.

In still yet another embodiment, the process 800 also includes receiving an ACA from the first CCF server at the router indicating the first CCF server successfully processed the modified ACR. In this embodiment, the received ACA is modified at the router to form a modified ACA. In the embodiment being described, the modified ACA is sent from the router to the NE.

Figure 9:
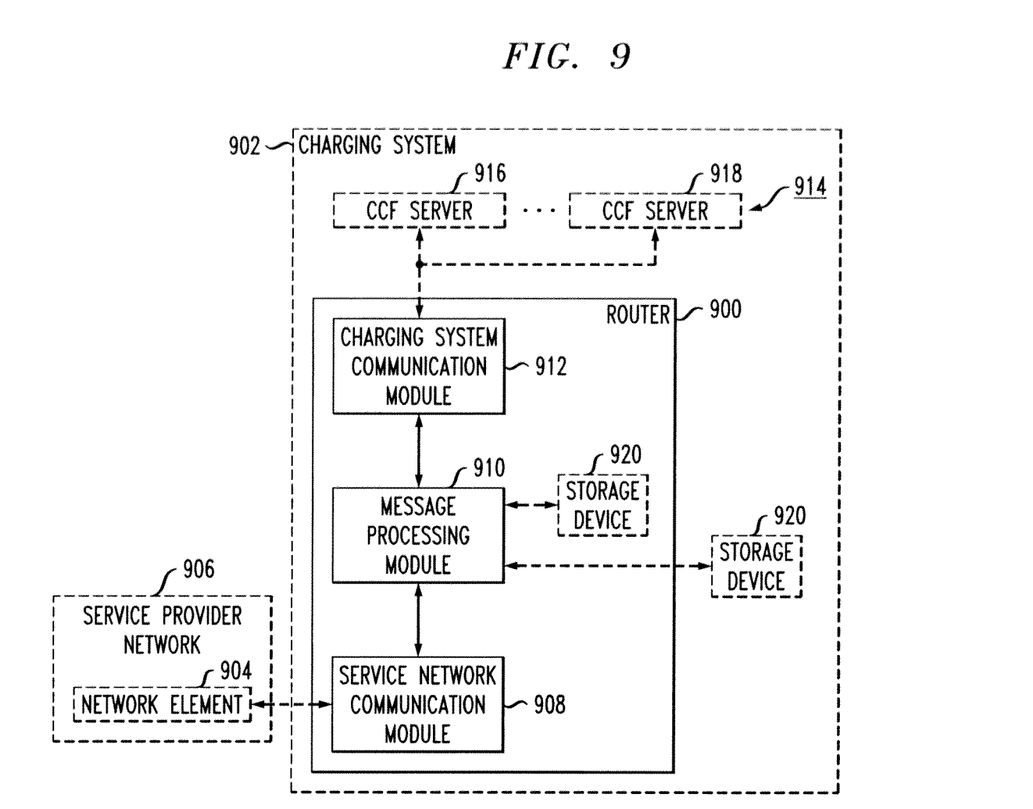
FIG. 9 is a block diagram of an exemplary embodiment of a router for use in a charging system to account for service provided by an NE of a service provider network.

With reference to FIG. 9, an exemplary embodiment of a router 900 for use in a charging system 902 to account for service provided by an NE 904 of a service provider network 906. The router 900 include a service network communication module 908, a message processing module 910, and a charging system communication module 912. The service network communication module 908 for receiving an ACR from the NE 904 of the service provider network 906. The ACR associated with service provided by the NE 904 in the service provider network 906 in conjunction with a communication session. The charging system 902 including a plurality of CCF servers 914 for processing ACRs from one or more NEs (e.g., 904) of the service provider network 906 in conjunction with one or more communication sessions. The message processing module 910 in operative communication with the service network communication module 908 for modifying the received ACR to form a modified ACR. The charging system communication module 912 in operative communication with the message processing module 910 for sending the modified ACR to a first CCF server 916 selected from the plurality of charging control function servers 914. The charging system communication module 912 is also for receiving an ACA from the first CCF server 916 indicating the first CCF server 916 was not able to process the modified ACR. The message processing module 910 is also for determining whether to resend the modified ACR to the first CCF server 916 via the charging system communication module 912 or to change the modified ACR to form a revised ACR and send the revised ACR to an alternate CCF server 918 via the charging system communication module 912. The alternate CCF server 918 being selected from the plurality of charging control function servers 914.

In another embodiment of the router 900, the message processing module is also for selecting the first CCF server 916 as a destination for the modified ACR based at least in part on information in the received ACR.

In a further embodiment of the router 900, the message processing module 910 is also for determining the received ACR is a start record for a new communication session for the NE 904 based at least in part on record type information in the received ACR and selecting the first CCF server 916 based at least in part on an algorithm that includes a load distribution function relating to distribution of processing loads among the plurality of CCF servers 914.

In a yet further embodiment of the router 900, the message processing module 910 is also for selecting the first CCF server 916 based at least in part on one or more of a load index for the first CCF server 916 in relation to load indexes for the plurality of CCF servers 914, a load carrying capacity for the first CCF server 916 in relation to load carrying capacities for the plurality of CCF servers 914, a round robin scheme in relation to the plurality of CCF servers 914, and a weighted round robin scheme in relation to the plurality of CCF servers 914. In a still further embodiment of the router 900, the load index is based at least in part on load information received from the plurality of CCF servers 914 via the charging system communication module 912. In another still further embodiment of the router 900, at least one of the round robin scheme and the weighted round robin scheme is based at least in part on applying an algorithm to session identifier information in the received ACR.

In another yet further embodiment, the router 900 also includes a storage device 920 in operative communication with the message processing module 910 for storing a session identifier, an originating source identifier, and a selected destination identifier for the new communication session in linked relation. In a still further embodiment of the router 900, the session identifier is adapted to identify the new communication session, the originating source identifier is adapted to identify the NE 904 as an originating source for the received ACR in conjunction with the new communication session, and the selected destination identifier is adapted to identify the first CCF server 916 as currently selected for processing ACRs for the new communication session that are originated by the NE 904. In other embodiments, the storage device 920 may be external to the router 900. The external storage device 920 may be located in any suitable NE of the charging system 902.

In another further embodiment of the router 900, the message processing module 910 is also for determining the received ACR is an interim record or a stop record for an ongoing communication session for the NE 904 based at least in part on record type information in the received ACR and selecting the first CCF server 916 based at least in part on matching the ongoing communication session to a session identifier linked to an originating source identifier representing the NE 904 and a selected destination identifier representing the first CCF 916. In this embodiment, the router 900 also includes a storage device 920 in operative communication with the message processing module 910 for storing the session identifier, originating source identifier, and selected destination identifier in linked relation in conjunction with routing of a previous ACR received from the NE 904 for the ongoing communication session. In other embodiments, the storage device 920 may be external to the router 900. The external storage device 920 may be located in any suitable NE of the charging system 902.

In a yet further embodiment of the router 900, the session identifier is adapted to identify the ongoing communication session, the originating source identifier is adapted to identify the NE 904 as an originating source for the received ACR in conjunction with the ongoing communication session, and the selected destination identifier is adapted to identify the first CCF server 916 as currently selected for processing ACRs for the ongoing communication session that are originated by the NE 904.

In yet another embodiment of the router 900, the message processing module 910 is also for changing origination information representing the NE 904 as an originating source of the received ACR in conjunction with modifying the received ACR to represent the router 900 as an intermediate source of the modified ACR, changing destination information representing the router 900 as an intermediate destination of the received ACR in conjunction with modifying the received ACR to represent the first CCF server 916 as a selected destination of the modified ACR, and adding route record information to the received ACR in conjunction with modifying the received ACR to represent the NE 904 as the originating source of the received ACR in the modified ACR. In a further embodiment of the router 900, the origination information in the received and modified ACRs includes origin host information and origin realm information. In another further embodiment of the router 900, the destination information in the received and modified ACRs includes destination realm information.

In still another embodiment if the router 900, the message processing module 910 is also for determining the ACA indicates the first CCF server 916 cannot process the modified ACR due to an overload condition and for determining the modified ACR is to be changed to form the revised ACR and sent to the alternate CCF server 918 by the charging system communication module 912 in lieu of resending the modified ACR.

In a further embodiment of the router 900, the ACA indicates the first CCF server 916 is too busy to process the modified ACR. In another further embodiment of the router 900, the ACA includes result code information with a code value of 3004.

In yet another further embodiment of the router 900, the message processing module 910 is also for selecting the alternate CCF server 918 as an alternate destination for the modified ACR based at least in part on an algorithm that includes a load distribution function relating to distribution of processing loads among the plurality of CCF servers 914.

In a yet further embodiment of the router 900, the message processing module 910 is also for selecting the alternate CCF server 918 based at least in part on one or more of a load index for the alternate CCF server 918 in relation to load indexes for the plurality of CCF servers 914, a load carrying capacity for the alternate CCF server 918 in relation to load carrying capacities for the plurality of CCF servers 914, a round robin scheme in relation to the plurality of CCF servers 914, and a weighted round robin scheme in relation to the plurality of CCF servers 914. In a still further embodiment of the router 900, the load index is based at least in part on load information received from the plurality of CCF servers 914 via the charging system communication module 912. In another still further embodiment of the router 900, at least one of the round robin scheme and the weighted round robin scheme is based at least in part on applying an algorithm to session identifier information in the modified ACR.

In another yet further embodiment, the router 900 also includes a storage device 920 for storing a session identifier, an originating source identifier, and a selected destination identifier for the communication session in linked relation. In a still further embodiment of the router 900, the session identifier is adapted to identify the communication session, the originating source identifier is adapted to identify the NE 904 as an originating source for the received ACR in conjunction with the communication session, and the selected destination identifier is adapted to identify the alternate CCF server 918 as currently selected for processing ACRs for the communication session that are originated by the NE 904. In still another further embodiment of the router 900, the charging system communication module 912 is also for receiving an ACA from the alternate CCF server 918 indicating the alternate CCF server 918 successfully processed the revised ACR. In this embodiment, the message processing module 910 is also for modifying the received ACA to form a modified ACA. In the embodiment being described, the service network communication module 908 is also for sending the modified ACA to the NE 904.

In still yet another embodiment of the router 900, the message processing module 910 is also for determining the ACA indicates the first CCF server 916 cannot process the modified ACR due to a transient failure condition and for determining the modified ACR is to be resent to the first CCF server 916 by the charging system communication module 912 in lieu of sending the revised ACR. In a further embodiment of the router 900, the ACA indicates the first CCF server 916 is at least temporarily out of space to process the modified ACR. In another further embodiment of the router 900, the ACA includes result code information with a code value of 4002. In yet another further embodiment of the router 900, the message processing module 910 is also for causing the charging system communication module 912 to wait a configurable time after receiving the ACA before resending the modified ACR. In still another further embodiment of the router 900, the charging system communication module 912 is also for receiving an ACA from the first CCF server 916 indicating the first CCF server 916 successfully processed the modified ACR. In this embodiment, the message processing module 910 is also for modifying the received ACA to form a modified ACA. In the embodiment being described, the service network communication module 908 is also for sending the modified ACA to the NE 904.

With reference again to FIG. 4, an exemplary embodiment of a non-transitory computer-readable medium storing program instructions that, when executed by a computer, cause a corresponding computer-controlled router in a charging system to perform a process for using the charging system to account for service provided by an NE of a service provider network. In various additional embodiments, the program instructions stored in the non-transitory computer-readable memory, when executed by the computer, may cause the computer-controlled router to perform various combinations of functions associated with the processes 400, 500, 600, 700, 800 for using a charging system to account for service provided by an NE of a service provider network with reference to FIGS. 4-8. In other words, the various embodiments of the processes described above may be implemented by the program instructions stored in the non-transitory computer-readable medium.

Likewise, in various embodiments, the program instructions stored in the non-transitory computer-readable medium, when executed by the computer, may cause the computer-controlled router to perform various combinations of functions associated with the various embodiments of the router 900 described above with reference to FIG. 9. For example, the computer-controlled device may include a router 900. Any suitable module described above with reference to FIG. 9 may include the computer and non-transitory computer-readable medium associated with the program instructions. Alternatively, the computer and non-transitory computer-readable medium associated with the program instructions may be individual or combined components that are in operative communication with any suitable combination of the modules described above with reference to FIG. 9.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method for using a charging system to account for service provided by a network element of a service provider network, comprising:
   receiving an accounting request from a network element of a service provider network at a router in a charging system, the accounting request associated with service provided by the network element in the service provider network in conjunction with a communication session, the charging system including a plurality of charging collection function servers associated with the router for processing accounting requests from one or more network elements of the service provider network in conjunction with one or more communication sessions;
   modifying the received accounting request at the router to form a modified accounting request;
   sending the modified accounting request from the router to a first charging collection function server selected from the plurality of charging control function servers;
   receiving an accounting answer from the first charging collection function server at the router indicating the first charging collection function server was not able to process the modified accounting request; and
   resending the modified accounting request from the router to the first charging collection function server or changing the modified accounting request at the router to form a revised accounting request and sending the revised accounting request from the router to an alternate charging collection function server selected from the plurality of charging control function servers.

2. The method of claim 1, further comprising:
   selecting the first charging collection function server as a destination for the modified accounting request at the router based at least in part on information in the received accounting request.

3. The method of claim 2, further comprising:
   determining the received accounting request is a start record for a new communication session for the network element based at least in part on record type information in the received accounting request; and
   selecting the first charging collection function server based at least in part on an algorithm that includes a load distribution function relating to distribution of processing loads among the plurality of charging collection function servers.

4. The method of claim 1, further comprising:
   changing origination information representing the network element as an originating source of the received accounting request in conjunction with modifying the received accounting request to represent the router as an intermediate source of the modified accounting request;
changing destination information representing the router as an intermediate destination of the received accounting request in conjunction with modifying the received accounting request to represent the first charging collection function server as a selected destination of the modified accounting request; and
adding route record information to the received accounting request in conjunction with modifying the received accounting request to represent the network element as the originating source of the received accounting request in the modified accounting request.

5. The method of claim 1, further comprising:
determining the accounting answer indicates the first charging collection function server cannot process the modified accounting request due to an overload condition, wherein the modified accounting request is changed to form the revised accounting request and the revised accounting request is sent to the alternate charging collection function server in lieu of resending the modified accounting request.

6. The method of claim 5 wherein the accounting answer indicates the first charging collection function server is too busy to process the modified accounting request.

7. The method of claim 5 wherein the accounting answer includes result code information with a code value of 3004.

8. The method of claim 5, further comprising:
selecting the alternate charging collection function server as an alternate destination for the modified accounting request at the router based at least in part on an algorithm that includes a load distribution function relating to distribution of processing loads among the plurality of charging collection function servers.

9. The method of claim 1, further comprising:
determining the accounting answer indicates the first charging collection function server cannot process the modified accounting request due to a transient failure condition, wherein the modified accounting request is resent to the first charging collection function server in lieu of sending the revised accounting request.

10. The method of claim 9 wherein the accounting answer indicates the first charging collection function server is at least temporarily out of space to process the modified accounting request.

11. The method of claim 9 wherein the accounting answer includes result code information with a code value of 4002.

12. The method of claim 9, further comprising:
waiting a configurable time after receiving the accounting answer before resending the modified accounting request.

13. An apparatus for use in a charging system to account for service provided by a network element of a service provider network, the apparatus comprising:
a service network communication module configured to receive an accounting request from a network element of a service provider network, the accounting request associated with service provided by the network element in the service provider network in conjunction with a communication session, the charging system including a plurality of charging collection function servers configured to process accounting requests from one or more network elements of the service provider network in conjunction with one or more communication sessions;
a message processing module configured to modify the received accounting request to form a modified accounting request; and
a charging system communication module configured to send the modified accounting request to a first charging collection function server selected from the plurality of charging control function servers;
wherein the charging system communication module is also configured to receive an accounting answer from the first charging collection function server indicating the first charging collection function server was not able to process the modified accounting request;
wherein the message processing module is also configured to determine whether to resend the modified accounting request to the first charging collection function server via the charging system communication module or to change the modified accounting request to form a revised accounting request and configured to send the revised accounting request to an alternate charging collection function server via the charging system communication module, the alternate charging collection function server being selected from the plurality of charging control function servers.

14. The apparatus of claim 13 wherein the message processing module is also configured to select the first charging collection function server as a destination for the modified accounting request based at least in part on information in the received accounting request.

15. The apparatus of claim 14 wherein the message processing module is also configured to determine the received accounting request is a start record for a new communication session for the network element based at least in part on record type information in the received accounting request and configured to select the first charging collection function server based at least in part on an algorithm that includes a load distribution function relating to distribution of processing loads among the plurality of charging collection function servers, the apparatus further comprising:
a storage device configured to store a session identifier, an originating source identifier, and a selected destination identifier for the new communication session in linked relation.

16. The apparatus of claim 14 wherein the message processing module is also configured to determine the received accounting request is an interim record or a stop record for an ongoing communication session for the network element based at least in part on record type information in the received accounting request and configured to select the first charging collection function server based at least in part on matching the ongoing communication session to a session identifier linked to an originating source identifier representing the network element and a selected destination identifier representing the first charging collection function, the apparatus further comprising:
a storage device configured to store the session identifier, originating source identifier, and selected destination identifier in linked relation in conjunction with routing of a previous accounting request received from the network element for the ongoing communication session.

17. The apparatus of claim 13 wherein the message processing module is also configured to change origination information representing the network element as an originating source of the received accounting request in conjunction with modifying the received accounting request to represent the apparatus as an intermediate source of the modified accounting request, configured to change destination information representing the apparatus as an intermediate destination of the received accounting request in conjunction with modifying the received accounting request to represent the first charging collection function server as a selected destination of the modified accounting request, and configured to add route record information to the received accounting request in conjunction with modifying the received accounting request to represent the network element as the originating source of the received accounting request in the modified accounting request.

18. The apparatus of claim 13 wherein the message processing module is also configured to determine the accounting answer indicates the first charging collection function server cannot process the modified accounting request due to an overload condition and configured to determine the modified accounting request is to be changed to form the revised accounting request and sent to the alternate charging collection function server by the charging system communication module in lieu of resending the modified accounting request and configured to select the alternate charging collection function server as an alternate destination for the modified accounting request based at least in part on an algorithm that includes a load distribution function relating to distribution of processing loads among the plurality of charging collection function servers, the apparatus further comprising:
 a storage device configured to store a session identifier, an originating source identifier, and a selected destination identifier for the communication session in linked relation.

19. The apparatus of claim 13 wherein the message processing module is also configured to determine the accounting answer indicates the first charging collection function server cannot process the modified accounting request due to a transient failure condition and configured to determine the modified accounting request is to be resent to the first charging collection function server by the charging system communication module in lieu of sending the revised accounting request.

20. A non-transitory computer-readable medium storing program instructions that, when executed by a computer, cause a corresponding computer-controlled router in a charging system to perform a method for using the charging system to account for service provided by a network element of a service provider network, the method comprising:
 receiving an accounting request from a network element of a service provider network at a router in a charging system, the accounting request associated with service provided by the network element in the service provider network in conjunction with a communication session, the charging system including a plurality of charging collection function servers associated with the router for processing accounting requests from one or more network elements of the service provider network in conjunction with one or more communication sessions;
 modifying the received accounting request at the router to form a modified accounting request;
 sending the modified accounting request from the router to a first charging collection function server selected from the plurality of charging control function servers;
 receiving an accounting answer from the first charging collection function server at the router indicating the first charging collection function server was not able to process the modified accounting request; and
 resending the modified accounting request from the router to the first charging collection function server or changing the modified accounting request at the router to form a revised accounting request and sending the revised accounting request from the router to an alternate charging collection function server selected from the plurality of charging control function servers.

21. A method for using a charging system to account for service provided by a network element of a service provider network, comprising:
 receiving an accounting request from a network element of a service provider network at a router in a charging system, the accounting request associated with service provided by the network element in the service provider network in conjunction with a communication session, the charging system including a plurality of charging collection function servers associated with the router for processing accounting requests from one or more network elements of the service provider network in conjunction with one or more communication sessions;
 modifying the received accounting request at the router to form a modified accounting request;
 sending the modified accounting request from the router to a first charging collection function server selected from the plurality of charging control function servers;
 receiving an accounting answer from the first charging collection function server at the router;
 determining the accounting answer indicates the first charging collection function server successfully processed the modified accounting request;
 modifying the received accounting answer at the router to form a modified accounting answer; and
 sending the modified accounting answer from the router to the network element.

\* \* \* \* \*